United States Patent
Anderson et al.

(10) Patent No.: US 7,196,644 B1
(45) Date of Patent: Mar. 27, 2007

(54) DECOUPLING OF ANALOG INPUT AND DIGITAL OUTPUT

(75) Inventors: Kent D. Anderson, Broomfield, CO (US); Gregory L. Silvus, Boulder, CO (US); Robert W. Warren, Jr., Loveland, CO (US)

(73) Assignee: Seagate Technology LLC, Scotts Valley, CA (US)

( * ) Notice: Subject to any disclaimer, the term of this patent is extended or adjusted under 35 U.S.C. 154(b) by 178 days.

(21) Appl. No.: 10/883,633

(22) Filed: Jul. 1, 2004

(51) Int. Cl.
*H03M 1/06* (2006.01)

(52) U.S. Cl. .................... 341/118; 341/155

(58) Field of Classification Search ........ 341/118–125, 341/155–165; 345/100, 98, 103; 348/189, 348/219
See application file for complete search history.

(56) References Cited

U.S. PATENT DOCUMENTS

| | | | |
|---|---|---|---|
| 5,255,136 A | 10/1993 | Machado | |
| 5,402,171 A * | 3/1995 | Tagami et al. | 348/219.1 |
| 5,588,027 A * | 12/1996 | Lim | 375/330 |
| 5,696,639 A | 12/1997 | Spurbeck | |
| 5,726,818 A | 3/1998 | Reed | |
| 5,760,984 A | 6/1998 | Spurbeck | |
| 5,812,334 A | 9/1998 | Behrens | |
| 5,829,011 A | 10/1998 | Glover | |
| 5,835,295 A | 11/1998 | Behrens | |
| 5,880,707 A * | 3/1999 | Aratani | 345/100 |
| 5,892,632 A | 4/1999 | Behrens | |
| 5,909,332 A | 6/1999 | Spurbeck | |
| 6,009,549 A | 12/1999 | Bliss | |
| 6,078,453 A | 6/2000 | Dziallo | |
| 6,097,769 A | 8/2000 | Sayiner | |
| 6,111,710 A | 8/2000 | Feyh | |
| 6,369,741 B1 | 4/2002 | Demicheli | |
| 6,480,349 B1 | 11/2002 | Kim | |
| 6,570,611 B1 * | 5/2003 | Satou et al. | 348/189 |
| 6,747,640 B1 * | 6/2004 | Okuno et al. | 345/213 |

* cited by examiner

*Primary Examiner*—Lam T. Mai
(74) *Attorney, Agent, or Firm*—Shumaker & Sieffert, P.A.

(57) ABSTRACT

A signal processing system includes a receiver for receiving an analog signal. The system also includes an analog-to-digital converter (ADC) coupled to the receiver. At each of a series of time intervals, the ADC outputs sequential digital codes. Each digital code corresponds to a sampled analog value of the received analog signal at each sample interval. The system further includes a memory in which the sequential digital codes may be stored, and a processing circuit for converting the digital codes into a series of binary data bits. The conversion may be performed in a different sequence than the sequence in which the digital codes are stored in the memory.

6 Claims, 9 Drawing Sheets

FIG. 9A
Normal Operation

FIG. 9B
Difficult 1st Sector

DECOUPLING OF ANALOG INPUT AND DIGITAL OUTPUT

TECHNICAL FIELD

This invention relates to systems for processing streams of information.

BACKGROUND

Communication and storage systems encompass several fields such as telephone, radio broadcasting, television, satellite transmission, optical communications, disc drives, tape drives and the like. In such communication systems, information may be coded to be transmitted or stored in another medium, transferred, and later decoded to reconstruct the original information. Most such systems are prone to noise and other disturbances that can cause errors to appear in the reconstructed information. In such systems, data may be transferred from one medium to another and eventually received in a usable form. Often the objective of such a system is to reproduce the original information as accurately as possible with the least distortion and fewest errors.

In a communications or storage system, signals containing information may propagate through a medium, or they may be stored on a storage medium. The signal may be received by a receiving element configured to detect the received or stored signal. In some systems, the encoded information signal is received as an analog waveform that may be processed by the data handling system to produce a decoded signal. Some communication systems are configured to convert the received signal to, for example, an electronic signal that can be conveniently processed. For example, the decoded signal may be in a digital (binary) format suitable for processing by the receiving host, which may be a computer.

Communication and storage systems may handle signals encoded with information, such as voice, video, audio, or raw data. Signals may also be encoded with meta-information. Such meta-information may include parity information, synchronization (timing) information, and other levels of information, including routing and message parameter information that an information handling system may use to process an incoming signal. The information may be received from a storage medium, such as a data storage device, or a stream of transmitted information, such as a satellite that broadcasts television signals, for example.

Prior to sending the decoded information to the host, some data handling systems may provide the detection and decoding of the information. The detection of the information is a process involving processing the signal to identify the information bits represented therein. The decoding of the information may occur after the detection process and may include the removal of meta-information or error detection and/or correction of the decoded information. Some hosts expect that the information sent by the data handling system will be in a particular sequential order, which is generally the same order in which the encoded information was received by the receiving element.

SUMMARY

An analog signal may be processed by a circuit with an architecture that decouples the input and output to provide a system in which the analog input signal information and the digital output information can be processed at different rates and in different sequences. This decoupling may be achieved, in part, by storing sampled values of the input signal in a buffer memory using a buffer manager.

In one embodiment, the decoupling may take place in stages to provide added flexibility at each intermediate stage. In a particular embodiment, this decoupling may be achieved, in part, by storing sampled values of the input signal in a first buffer memory. The first buffer memory decouples the capturing of the signal from the detection of the information bits. Further decoupling may be achieved, in part, by storing the detected information bits to a second buffer memory. The second buffer memory decouples the detection of the information bits from the correction of the detected information bits.

For example, the first and second buffer memories may be integrated into a single buffer memory with these two or more clients that may use a buffer manager to arbitrate the usage of the shared memory resource. The buffer memory or memories may be implemented in a variety and using a variety of technologies, for example a single embedded D-RAM.

In another embodiment, an information handling system may include a receiving element coupled to an analog-to-digital converter (ADC) that outputs digital codes that represent samples of the analog input signal. These digital codes may be initially stored in a buffer memory. The digital codes may be subsequently accessed and processed to improve the performance of the information handling system.

In another embodiment, the information handling system includes a digital processing unit for recovering a sequence of information bits from the digital codes representing the sampled analog values. As such, the information handling system can be flexibly used to improve performance by correcting errors. This may be achieved, for example, by applying sampled analog values with varied detection algorithms and detection algorithm parameters and thereby reducing the need to try to re-read the data or, in some systems, prevent the loss of information.

In another embodiment, the digital processing unit may comprise a general-purpose processor, enabling the detection algorithm to be changed by a change of software or firmware.

For example, the general-purpose processor may be extended by means of specialized coprocessor units that accelerate common detection algorithm tasks such as filtering or Viterbi detection.

In another embodiment, the information handling system includes both a digital processing unit and an error correction engine for detecting and correcting errors. As such, the information handling system can be flexibly used to improve performance by correcting errors in the detected information bits.

Some embodiments may provide one or more advantages. For example, by saving analog samples into memory, a low signal-to-noise ratio (SNR) may be compensated by applying multiple and varied correction algorithms that operate on the analog samples. One exemplary algorithm compensates for errors by averaging samples obtained from two or more read attempts. To perform this algorithm, a digital processing unit may resample the sequence of analog samples, interpolating between the captured analog samples to estimate the analog waveform at the particular time instants when the bit actually was transmitted or written. The resampling produces synchronous samples which, when aligned with one or more additional sets of synchronous samples, provides for averaging to be performed across the sets. The result, an averaged sequence of synchronous samples, is a composite of each of the original sequences of analog samples and may have an improved signal-to-noise ratio relative to the original sequences of analog samples.

Storing analog samples in a read channel memory may also enable a data handling system to post-process stored samples by using one or more algorithms that operate on the analog samples of the input signal to attempt to correct any data errors. Such "readless" re-try techniques may improve the performance of the system. For example, in a disc drive read channel, readless re-tries may reduce the need to wait for the disc to revolve one or more times to attempt to re-read the data. Moreover, a read attempt of a number of sectors of data may be completed even if one of the sectors is determined to have an error. In some examples, the analog samples stored in the buffer memory may be used to correct errors "on the fly," i.e. within one sector time. Accordingly, a re-try may be attempted using one or more detection algorithms without physically re-reading the data. When reading from near the inner diameter of a disc, for example, the data rate in the analog front end (AFE) may be less than the data rate at other radii. During the extra slack time, a system may attempt to correct errors in the data by applying some algorithms to the stored analog values associated with the error. Yet another advantage is that a read request may be completed even if errors have been detected because the stored analog values in memory permit the error correction to be deferred until a later time. Consequently, embodiments of this system remove the requirement that samples be processed immediately when received.

The details of one or more embodiments of the invention are set forth in the accompanying drawings and the description below. Other features, objects, and advantages of the invention will be apparent from the description and drawings, and from the claims.

DESCRIPTION OF DRAWINGS

Like reference symbols in the various drawings indicate like elements.

DETAILED DESCRIPTION OF ILLUSTRATIVE EMBODIMENTS

A signal processing system includes a receiver for receiving an analog signal. The system also includes an analog-to-digital converter (ADC) coupled to the receiver. At each of a series of time intervals, the ADC outputs sequential digital codes. Each digital code corresponds to a sampled analog value of the received analog signal at each sample interval. The system further includes a memory in which the sequential digital codes may be stored, and a processing circuit for converting the digital codes into a series of binary information bits. The conversion may be performed in a different sequence than the sequence in which the digital codes are stored in the memory.

According to one embodiment, error correction may be applied using one or more detection algorithms that process the data samples stored in the memory to produce information bits. Additional error correction may be applied using one or more error detection and correction algorithms that process the information bits to produce corrected information bits. In this way, the detected information bits corresponding to the analog signal received by the receiver may be reconstructed as a digital signal prepared for transmission to, for example, the host. A host computer typically requires the decoded signal to be sent by the system in the original sequence. As such, the data handling system must typically send the decoded information in proper sequential order according to the originally received encoded signal. Accordingly, a buffer memory may be used to store unsent decoded information while some other information is being moved out of the buffer for detection and further information is being moved out of the buffer for error detection and correction using ECC methods. Once the data handling system has corrected the data, it can then send a properly sequenced signal in, for example, digital format to the host.

Embodiments include a hardware memory in a signal processing system, such as a data handling system. In one exemplary embodiment, a hardware memory may be included in the read channel of a data storage device, such as a disc drive. For example, a data handling system that includes a receiver may be coupled to an analog-to-digital converter (ADC) that samples an analog value of a received input signal. At each sample time, the ADC may output sequential digital codes that each correspond to a sampled analog value of the electronically encoded signal. The sequential digital codes may be stored in the memory in the read channel of the data handling system. Prior to being sent to the host, the stored sequential digital codes may be detected into binary/digital values that represent a decoded version of the received electronically encoded signal. By storing the values in memory in this way, an error detection engine may be used to detect errors in the stored sequential digital codes or the binary values that represent a decoded version of the received electronically encoded (analog) signal.

In one example, a signal processing system includes a read channel having an analog front end (AFE), a digital back end (DBE), and an interface there between. The AFE-DBE interface may include an analog-to-digital converter (ADC) that converts a received analog waveform received by the receiving element into a series of digital codes representative of the analog values. For example, the ADC may convert an analog voltage signal into a series of digital codes by sampling the analog value at a corresponding series of time intervals. In this example, the series of digital codes may be stored in channel buffer memory for subsequent processing. As stored in channel buffer memory, the digital codes represent sample analog values of the received input waveform.

The received input waveform may represent an information-carrying signal. The information signal may be received by a receiving element, such as the head of a disc drive that reads the magnetically stored information on the surface of a rotating disc. In other examples, the receiving element may be coupled to an antenna, or a wired connection, such as a cable TV source, an Ethernet connection, a T-1 connection, ISDN, telephone line (POTS), RS-232 or RS-485, optically coupled signals, or the like. Accordingly, the receiver may receive an electronically encoded signal that may be in a RF, optical, electrical, and infrared, or other similar form in which encoded information may be propagated in a medium. In some embodiments, the signal processing system may be used to communicate, for example, using cellular telephonic systems or the Internet. The electronically encoded signal may contain encoded information such as data, video, voice, audio, or other information. The signal may also include meta-information, such as parity, start, stop, hand-shaking, timing information, and other meta-information about the data to provide, for example, error detection and correction.

In other embodiments, the read channel memory may be included in a data handling system that does not read data directly from a disc drive. For example, if the receiver receives an encoded signal containing information from an antenna, the read channel memory may be used to store samples of analog values such that when a decoding of the received signal produces an error, the error can be corrected by attempting to apply one or more algorithms to the stored analog samples in the read channel memory. Accordingly, system performance for information received in real-time from a source, such as an antenna, may be improved by storing samples of the analog waveform in the read channel memory.

Some data handling systems receive streaming signals in real-time without a read channel memory, the real-time data, which is typically video or audio information, cannot be re-read by the data handling system. As such, storage of the sampled analog values enables a data handling system to attempt various correction algorithms to recover from errors that are detected during the decoding process. Thus, in some embodiments, information loss in streaming real-time applications may be reduced by storing analog samples that can be post-processed using various algorithms to attempt to correct the errors.

Some conventional read channels work as a pipeline. At its input, the front end of the pipeline receives an analog waveform. At its output, the pipeline produces a stream of binary data bits, often still encoded. The output may be time-shifted from the input by the pipeline delay of the channel. As such, the entire pipeline may be described as tightly coupled. With the exception of small adjustments made for timing recovery and code rate effects, every bit period of waveform received at the input corresponds to a user data bit at the output, and the data (waveform or bits) proceed in an unbroken stream through the pipeline with substantially the same processing performed on each datum. With this architecture, flexibility may be limited to parameters that can be made user programmable, or features that can be built with acceptable cost (small integrated circuits) into the pipeline. This flexibility may be most useful when the normal channel algorithm fails. In a conventional disc drive, for example, a read error may cause the read channel to attempt to re-read the data from the media. However, this involves a delay while the disc spins back around to read the data. If re-reading is not successful, certain programmable parameters in the read channel may be tweaked. Nonetheless, the data recovery algorithm is not fundamentally altered.

Figure 1:
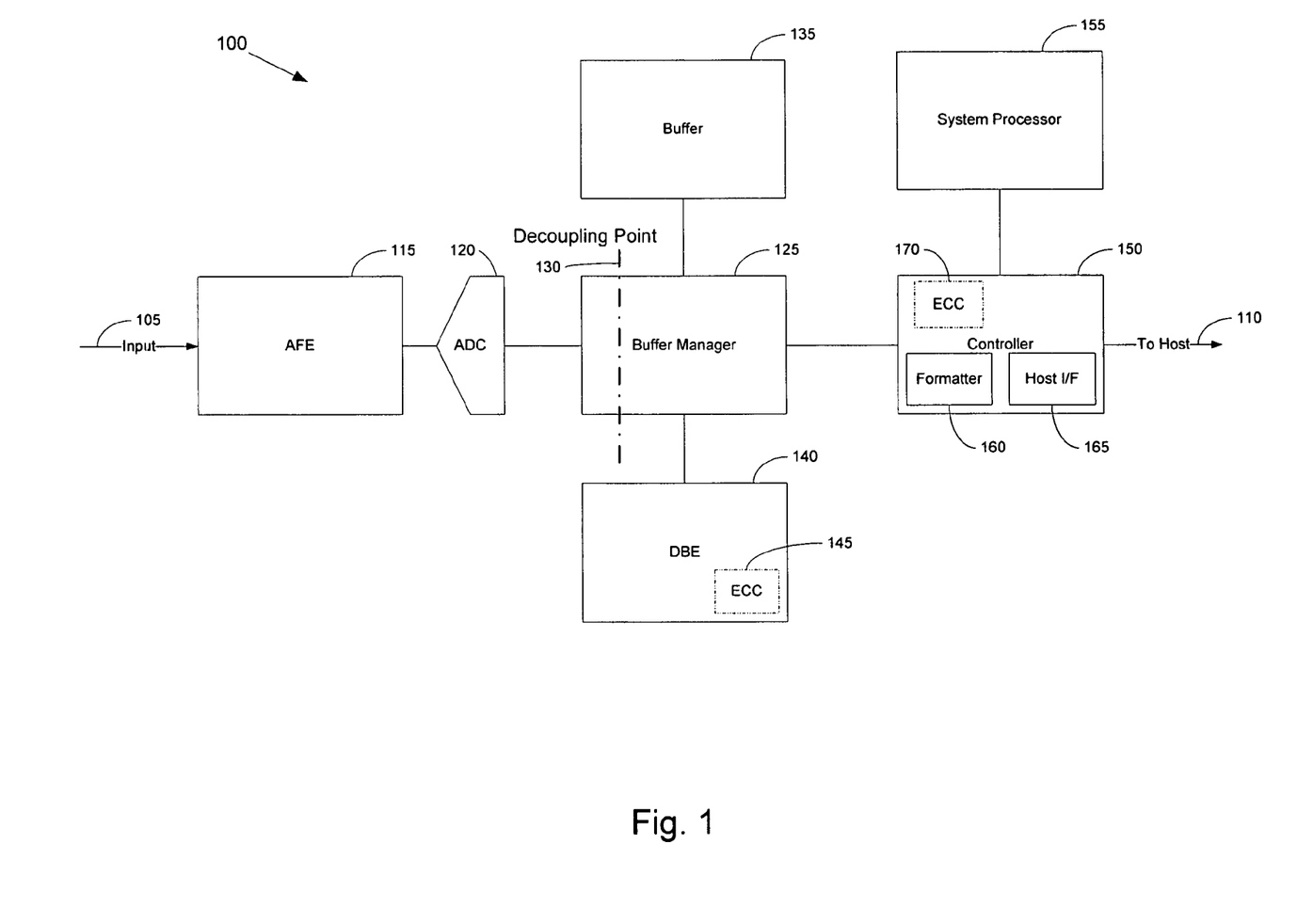
FIG. 1 is a functional block diagram of a signal processing system that includes a buffer to decouple the analog front end (AFE) from the digital back end (DBE).

In FIG. 1, a signal processing system 100 receives an analog input signal 105. The input signal 105 may contain encoded information that, after processing through the system 100, is sent to the host as digital data on signal 110. The input signal 105 is an input to analog front-end circuit (AFE) 115. The AFE 115 processes the analog input signal 105, such as by adjusting the gain and providing filtering. After passing through the AFE 115, the signal is sampled and converted to a digital code by an analog-to-digital converter (ADC) 120. The ADC 120 samples the analog waveform output by the AFE 115 at sequential sample intervals and outputs a series of digital codes that represent the value of the analog input signal. In some examples, the analog value represented by the digital code may be the voltage corresponding to the input signal 105. The buffer manager 125 receives the digital codes output by the ADC 120. The buffer manager 125 straddles an imaginary boundary that is herein referred to as a decoupling point 130. The decoupling point 130 refers to the decoupling of the serial stream of information corresponding to the analog input signal 105 on the AFE side of the decoupling point. The signal processing on the DBE side of the decoupling point 130 uses primarily digital techniques and operates on digitized data between the decoupling point 130 and the output signal 110. According to one embodiment, the data rates on the AFE side of the decoupling point can be different than the data rates on the DBE side. As will be shown, the signal processing on the DBE side may also be performed out of sequence relative to processing performed on the AFE side of decoupling point 130.

The buffer manager 125 sends the digital codes received from the ADC 120 to the buffer 135. The buffer 135 represents the memory space in which the digital codes may be stored. Once stored, using for example a FIFO arrangement, the buffer manager 125 may subsequently retrieve the stored digital codes for later processing in the DBE. The buffer manager 125 retrieves the digital codes, for example, for processing by the DBE 140. After the DBE 140 receives a digital code from the buffer manager 125, the DBE performs processing such as equalization, detection, and decoding to convert the digital codes into a sequence of binary information bits. In some embodiments, the DBE may also perform some error detection and correction (EDAC) using its error correction code (ECC), as indicated by ECC 145.

In some embodiments, referring again to FIG. 1, the DBE 140 sends the uncorrected binary information bits back to the buffer 135 via buffer manager 125. Once stored, the DBE 140 retrieves the uncorrected binary information bits from buffer 135 via buffer manager 125 for error correction and detection. In such embodiments, this allows a further decoupling of the detection algorithms from the error correction and detection algorithms.

After converting the digital codes to corrected information bits, the DBE 140 sends the bits back to the buffer manager 125 for storage in the buffer 135, in one embodiment. When the bits are ready to be sent to the host, a controller 150 may retrieve the bits from the buffer 135 via the buffer manager 125. A formatter 160 within the controller 150 may format the bits so that they are presented on the host interface in the sequence and format expected by the host. The formatted bits may then be sent to the host by the host interface 165.

In an alternative embodiment, also depicted in FIG. 1, after converting the digital codes to corrected information bits, the DBE 140 sends the bits directly to the formatter 160 in the controller 150. The formatter first formats the bits and then sends the bits to the buffer 135 via the buffer manager 125. The host interface 165 may then retrieve the bits from the buffer 135 via buffer manager 125 to present to the host as output signal 110.

In some embodiments, the controller 150 also performs error detection and correction, as indicated by ECC 170. In such an embodiment, error detection and correction may not be performed by the DBE 140, and ECC 145 may be removed.

The buffer manager 125 can, in some embodiments, manage the memory by arbitrating access between several clients, the AFE 115, the DBE 140, and the controller 150. In one embodiment, the interface between the ADC 120 and the buffer manager 125 may be configured such that digital codes output by the ADC may be transferred to the buffer 135 using direct memory access (DMA) techniques. In some implementations, the buffer manager 125 manages the accesses of the information stored in the buffer 135 by using FIFOs. FIFOs provide temporary storage for the data of a first client if the buffer is unavailable as when the buffer manager is allocating buffer access to another client.

The system 100 operates according to the above description in the exemplary embodiment, under the supervision of a system processor 155. The system processor 155 may perform high-level supervisory functions, such as determining how to respond to read requests from the host. The system processor may off-load various tasks to the controller 150, as described above.

Some embodiments described herein disclose architectures in which the AFE signal processing is decoupled from the DBE signal processing by buffering analog samples into a buffer memory. In some systems, this decoupling may break some feedback control loops that were conventionally closed for gain, timing, and offset correction. As needed, the timing control loop may be replaced in appropriate embodiments by, for example, performing interpolated timing recovery. Gain and offset control loops may be replaced with, for example, a two-part solution. The first part comprises a calibration of the AFE so that the analog signal processing will generally perform under most circumstances within a satisfactory operating range. By tuning the AFE, the error signals are likely to fall within a range that can be satisfactorily compensated by closing digital control loops entirely in the DBE. Thus although the decoupling the AFE and DBE can break conventional feedback control loops for gain, timing, and offset, alternative methods, such as those described, can be used to compensate the system.

Figure 2:
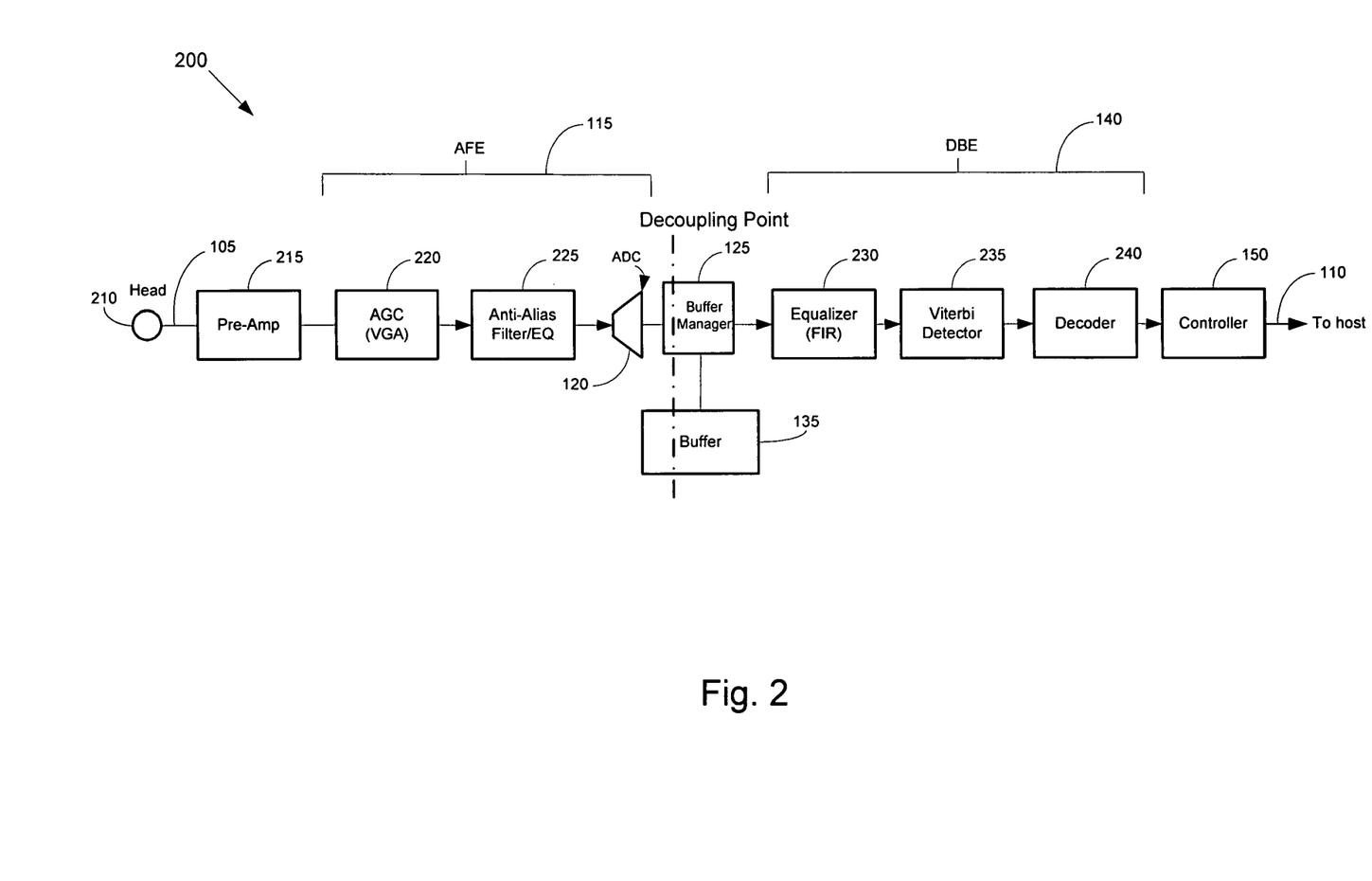
FIG. 2 is a functional block diagram of a read channel for a disc drive.

In FIG. 2, an exemplary system is illustrated as implemented in a disc drive application. The elements described are representative, and not meant to exhaustively illustrate every potential architecture for a disc drive read channel. According to this example, a head 210 provides the input signal 105 by sensing, for example, magnetic fields on the surface of a rotating disc (not shown). Before the AFE 115 processes it, a pre-amp 215 boosts the input signal 105. The amplified signal is next sent to an automatic gain control circuit (AGC) 220, which adjusts the amplitude to within a suitable operating range. Next, in this example, the signal passes to an anti-aliasing filter that may also include an equalizer 225. The anti-aliasing filter/equalizer 225 may provide some filtering that, among other things, minimizes aliasing effects associated with sampling for the ADC 120. Accordingly, the AFE 115 of this example includes elements 220, 225, and 120.

The ADC 120 outputs a digital code based upon the voltage of a sample of the input signal after processing by filter 225. The digital code for each sample interval is sent for storage in the buffer 135 by means of buffer manager 125. Buffer manager 125 may arbitrate between multiple clients of the buffer 135. Such clients may provide other functions in the disc drive system. Once stored, the system 200 may retain the sample values in storage until the samples have been successfully converted into data bits that contain no errors. If errors are detected after converting the samples to bits, then, in some embodiments, the stored samples may be used to correct the errors.

The digital processing circuits, or digital back end (DBE) of the exemplary disc drive read channel is illustrated with an equalizer 230 coupled to the buffer manager 125. In that embodiment, the equalizer may perform finite impulse response (FIR) filtering by applying coefficients (multipliers) to sample values, for example. Some FIR filters may be adaptive or have reprogrammable coefficients, for example, and may be implemented in hardware or in software. Next, a Viterbi detector 235 may be applied to further process the signal. The DBE 140 of this illustration is completed by the decoder 240, which may translate, as needed, to a code that is compatible with the host. Finally, the signal passes to the controller 150 for final processing before being read by the host.

In accordance with the foregoing, the read channel in a disc drive may be one example of an information handling system. In that example, a magnetic disc drive reads from and writes to the magnetic recording medium by means of a recording head. The recording head typically consists of two elements, a reader, and a writer. These elements may be electrically connected via a preamplifier (215) to the read channel, which is connected in turn to the host device via the disc controller (150). During a write operation, the read channel receives the user's digital data bits from the controller, encodes them and produces an analog write waveform that is suitable for driving the preamplifier to write to the magnetic media. During a read operation, the read channel may receive a waveform (a time varying analog voltage signal), and may synchronize, sample, shape, detect, and decode the waveform to reproduce, as accurately as possible, the data bits written on the magnetic media.

Some conventional read channels include an analog front end (AFE) and a digital back end (DBE), so named for their implementation technology and their placement in the path of the read back waveform. The AFE is usually responsible for tasks such as amplitude asymmetry correction (correcting a nonlinear effect of the reader element), thermal asperity mitigation (removing occasional low frequency anomalies caused when media bumps collide with the recording head), anti-aliasing and equalization, synchronous sampling, and feedback loop correction of gain, offset, sample phase and frequency, and baseline wander (the low frequency signature of perpendicularly oriented media when read in an AC coupled system). Though some feedback loops may be closed in analog, some conventional read channels may implement error computation and loop compensation filters in digital circuitry, incorporating digital-to-analog conversion before closing the feedback loops.

The DBE of some conventional read channels may receive a synchronously sampled readback waveform from the AFE and equalize or shape the waveform, detect the recorded bits, decode the recorded bits to produce the user's bits, and compute the errors and their corresponding corrections for the feedback loops. In these conventional read channels, the AFE and DBE work in tandem as a pipeline. The readback waveform enters the front of the pipeline at the input to the AFE and proceeds through the various data recovery steps to emerge at the other end of the pipeline, the output of the DBE, as user data bits. Each stage in this pipeline operates simultaneously, but at different time indices within the waveform. (The waveform may be converted into a sample stream and then into a bit stream as it progresses through the read channel pipeline).

Figure 3:
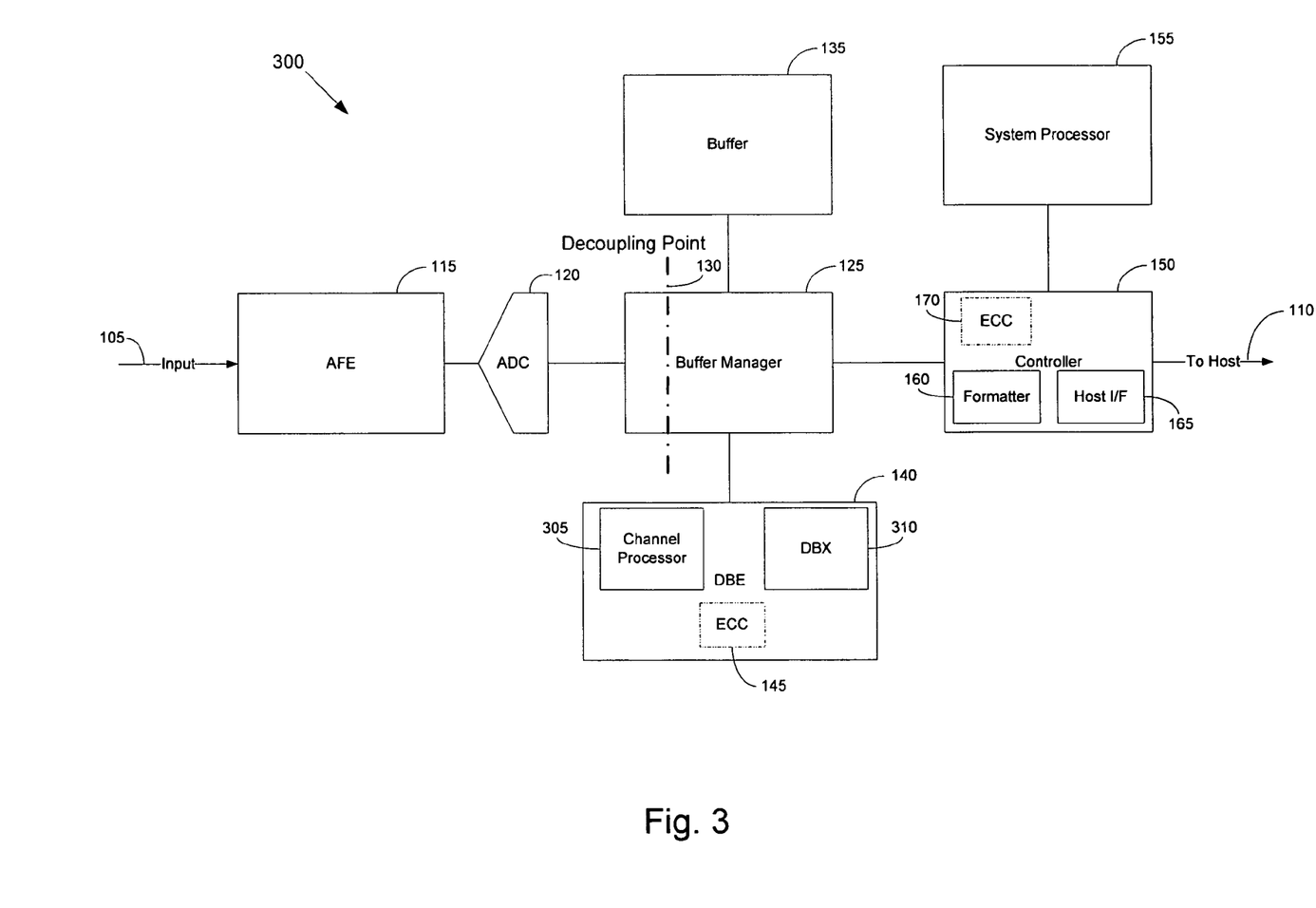
FIG. 3 is a functional block diagram according to FIG. 1, with a channel processor.

The signal processing system 100 of FIG. 1 may be modified to include a channel processor 305, as shown in the system 300 of FIG. 3. The channel processor 305 can be a general purpose processor running software or firmware, and can communicate closely with the components 230, 235, and 240 of FIG. 2, labeled as DBX 310 in FIG. 3. Both the channel processor 305 and the DBX 310 may be closely coupled to the buffer manager 125.

Putting a memory and a general-purpose processor (GPP), or channel processor 305, into the read channel may fundamentally alter the temporal sequencing of data in the pipeline. The memory may be used as described herein to decouple the analog input signal 105 processing in the AFE 115 from the processing that takes place in the DBE 140. The de-coupling lifts the requirement for the DBE to perform real-time processing established by the AFE data rate. As such, the GPP may be made flexible enough to perform a variety of different algorithms on the samples of the analog waveforms. In addition, the processor may reduce pipeline complexity by assuming low bandwidth tasks normally done in the read channel pipeline, for example calculating equalizer coefficients for equalizer 230. The processor may also take on other tasks within the system that are not performed by an element in a conventional read channel. For example, the processor may optionally perform ECC 145 by executing pre-programmed software instructions.

In another example, the processor may perform tasks when the normal read channel processing fails. During the normal re-try (re-read), there may be a significant waiting period while the disc rotates to the target sector, for example. During this waiting period, the processor may retrieve the samples from the channel memory and attempt to change the programmable parameters of the pipeline or change the algorithm altogether in an attempt to recover the data on a second or subsequent pass through the samples. If the processor is tightly coupled to the read pipeline, it may be able to insert or retrieve from the pipeline at many different nodes within the system. This allows the processor to re-use parts of the pipeline that can very efficiently perform some of the steps of the new algorithm (FIR filtering, for example). If the change of parameters or algorithm results in the data being recovered before the disc completes a full revolution to re-read the sector, then disc drive performance (data access speed) has been improved. If the data cannot be recovered before being read again and the data still cannot be recovered from the second read, it is possible to use the information available from both sets of samples, the first and second read (and even subsequent reads), in an attempt to recover the data so that no user data is lost. This represents an improvement in disc drive reliability. An example of this may be the averaging of samples from successive reads of the same difficult-to-recover data sector.

In one embodiment of the read channel architecture, the read channel is replaced in part and/or assisted by a tightly coupled, general-purpose processor running software or firmware. In one embodiment the processor may be realized as a digital signal processor (DSP). The DSP is coupled to the read channel pipeline so that it may single step through the read channel algorithm. Furthermore, the DSP may be enabled to insert data into the pipeline at a plurality of predetermined nodes, or read data from the pipeline at a second plurality of predetermined nodes.

The DSP may be capable of reproducing digital computations. The DSP is a part of the DBE. The remainder of the DBE may comprise acceleration units (co-processors) and pipeline stages normally found in the DBE of a conventional digital read channel. The analog portion (AFE) of the channel pipeline may be similar in structure to that of a conventional read channel. However, instead of the AFE's analog-to-digital converter (ADC) feeding directly into the DBE, the ADC stores the waveform samples into a buffer memory 135 through the buffer manager 125. This buffer memory may be internal to the read channel, or it may re-use the disc drive's conventional buffer memory. The memory may be implemented in a variety of technologies including, but not limited to, embedded dynamic random access memory (EDRAM). The DBE then reads the sample values from the channel buffer before processing them. This provides the benefit that the AFE is de-coupled from the DBE, at least until the channel buffer runs out of available space to store ADC samples from the AFE. Because of this de-coupling, the DBE may postpone the digital processing of a sector (the smallest addressable unit of data bits stored on the disc) to complete special processing on a previous sector or for the DSP to perform other useful functions.

Because the samples are stored in the buffer memory before the digital processing is performed, it is possible to process a set of samples multiple times. If a sector were to be read from the disc, sampled, stored in memory, processed by the DBE, and found to be unrecoverable (for example, the number and type of bit errors exceeded the capability of the error correcting code), then the samples could be recalled from the buffer memory and reprocessed using some alternate processing method. This technique may be referred to as a readless re-try (as opposed to a re-read). The altered processing method may be as simple as changing some parameters of the read channel, or they may be as complex as running a different algorithm. If reprocessing the samples using the readless re-try does not recover the data, then the disc drive may still recover the data by performing a re-read; however, in the event that a re-read is not successful, a further benefit of the architecture is that it allows both sets of samples to be used to recover the data by extracting and combining the information contained within the two sets of samples. This technique may be referred to as "sample averaging." Sample averaging can be extended to three or more sets of samples from multiple reads if necessary.

In one embodiment, a general purpose processor (channel processor, possibly a DSP) may be augmented by acceleration units capable of executing the channel algorithms in less time than a channel processor may be able to execute them by itself. In this embodiment, the read channel can be made both flexible and fast. In order to execute some computationally expensive channel algorithms, the processor may have the assistance of some hardware acceleration units. In some embodiments, it may be allowed more than the normal sector time to perform the algorithm. Readless retries and re-reads allow the processor to take the additional time necessary to perform more of the algorithm steps, but it is highly desirable to have hardware acceleration in order to expedite the processing and allow multiple retries to be attempted between each re-read of a sector (multiple retries per disc revolution).

In one embodiment, the channel processor 305 may receive a command from the system processor 155 to set up the parameters for the read channel to perform a read of a particular sector or sectors. The channel processor 305 may respond by retrieving a zone table containing information about zones on the media. Typically, a zone table containing the parameters associated with various sectors may be loaded into a buffer memory at start-up. After retrieving the necessary parameters from the zone table, the channel processor may send appropriate control and data signals to configure, for example, the gain to be used to read specific sectors. This is an example of the channel processor 305 assuming some of the responsibilities assigned to the system processor 155 in a conventional system.

One class of readless re-try methods involves reprocessing the samples after removing the delay in one or more of the feedback control loops. The feedback control loops may include, for example, gain, offset, timing recovery, or baseline wander correction control loops. In one example, the sequence of operations for a delay-free gain loop in a re-try mode may be as follows:

1. Normal capture of the sector, storing the samples in memory.
2. Normal detection of the sector using samples in memory. Recovered data bits are stored in memory as usual.
3. ECC correction is attempted but fails to correct the sector.
4. Retrieve samples from memory and reprocess, saving the gain error estimate into the memory instead of the recovered data bits.
5. Retrieve the gain error estimates from memory and use the processor to filter the gain error estimates. The processed gain error estimates are stored in memory. This replaces the gain loop compensation filter, but the processor's loop compensation filter may have one or more of the new steps below:
   a. Before or after filtering the sequence is shifted forward in time to offset the effects of any pipeline delays known to be in the gain loop hardware (either before the gain error estimate or after the loop compensation filter).
   b. After applying a normal filter, the entire resulting sequence is shifted forward in time to offset the effect of the group delay of the filter.
   c. After applying the filter in the forward direction, the entire resulting sequence is time-reversed, passed through the filter again, and time-reversed again. This is a well known signal processing method for filtering with no group delay.
   d. The filter may be a non-linear process that searches for sudden changes in gain, like a defect on the media, and produces a filtered sequence that responds to the sudden change immediately (with no delay). This could be analogous to the edge detection algorithms used for image processing simplified for a one-dimensional image (the sequence of gain error estimates).
6. Retrieve the samples from memory, as well as the filtered gain error estimates, and reprocess the data; this time, however, gain correction is handled directly by the processor with the processor pre-empting the gain loop by inserting its own filtered gain error estimates at the output of the loop compensation filter.

According to the foregoing example, readless re-try techniques may improve operation with respect to different feedback loops. For example, using readless re-try with the gain loop may counteract sector defects that have grown (due to oxidation of the recording media, for example), or defects that were not mapped out when the drive was manufactured. Applying readless re-try techniques to the timing recovery loop may mitigate vibration effects, such as when a disc drive is operated while it is carried or worn. Applied to the offset loop or baseline wander correction loop, this technique may provide extra margin against other types of errors.

Figure 4:
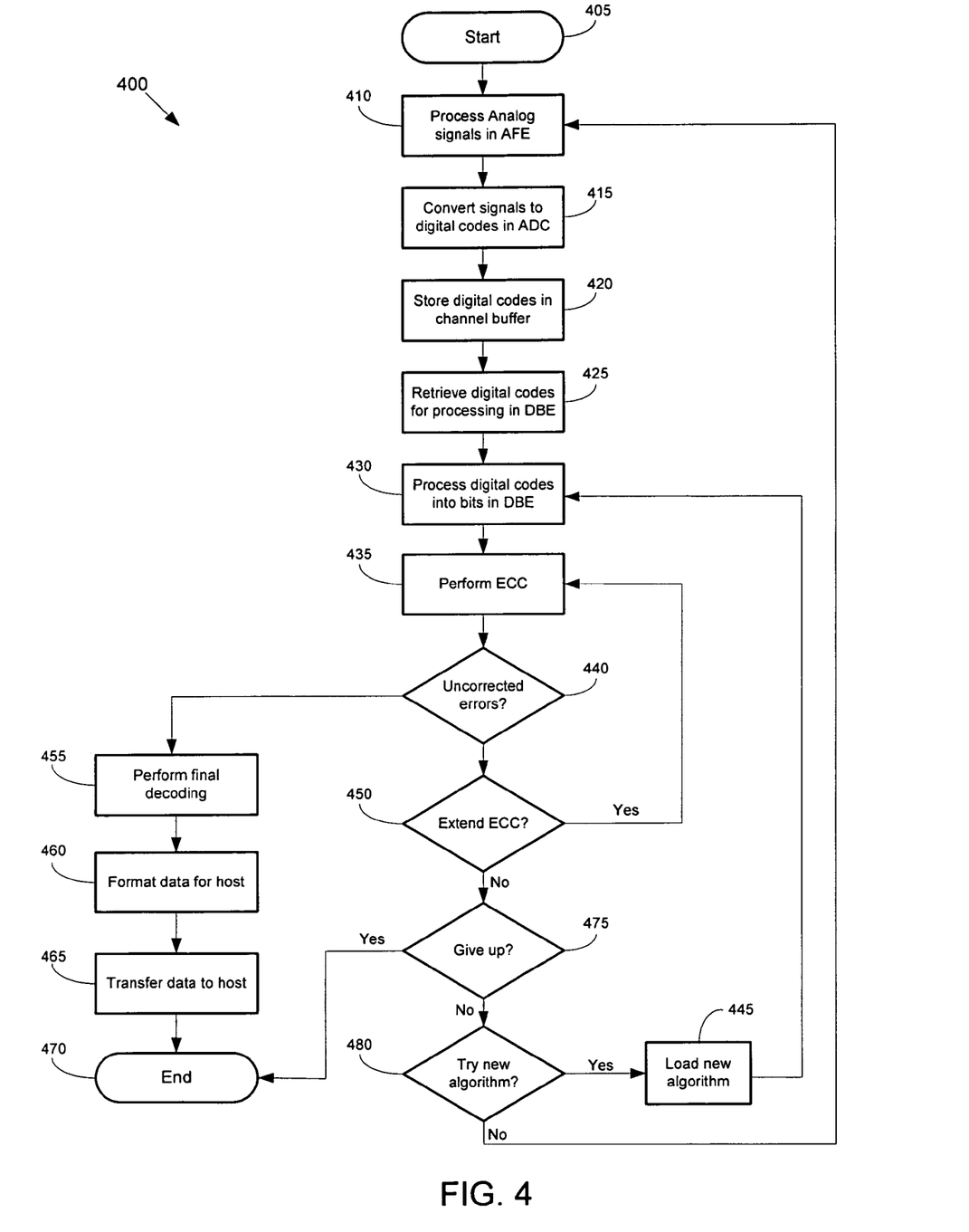
FIG. 4 is a flowchart of a method of operating the data handling system in FIG. 3.

In FIG. 4, a method of operating a signal processing system to process an incoming analog input signal, in accordance with some of the above-described examples, begins at step 405. The AFE processes the analog input signal at step 410. The ADC converts the processed analog input signals to digital codes at step 415. The buffer manager directs the digital codes to be stored in the buffer at step 420. The DBE retrieves the digital codes from the buffer memory in preparation for processing at step 425. The DBE processes the digital codes into bits at step 430, and performs ECC correction (to the extent possible in one sector time) at step 435. At step 440, the system checks for uncorrected errors that may still remain. If there are any uncorrected errors, then the control flow follows one of several paths. The decision may be to extend the ECC correction time to use up to the full power of the ECC code, which from step 450 returns to step 435 to continue ECC correction. The decision may be to give up in step 475 and quit, reporting an uncorrectable error to end at step 470. The decision may also be to try the next algorithm for processing the digital codes that are stored in the buffer memory. When this decision is made in step 480, the code for the new algorithm is loaded at step 445 then the control flow returns back to step 430 to process the digital codes into bits under the effect of the newly loaded algorithm. Finally, the decision may be to reread the data in which case the control flow returns to step 410 and the rereading of a new analog signal by the AFE. Extending ECC, trying new algorithms, and rereading, continues until no errors remain at step 440 or until the system declares failure in step 475. When error correction is successfully completed, final decoding is performed at step 455. The controller may format the data and transfer the data to the host at steps 460, 465 to end the procedure at step 470.

Figure 5:
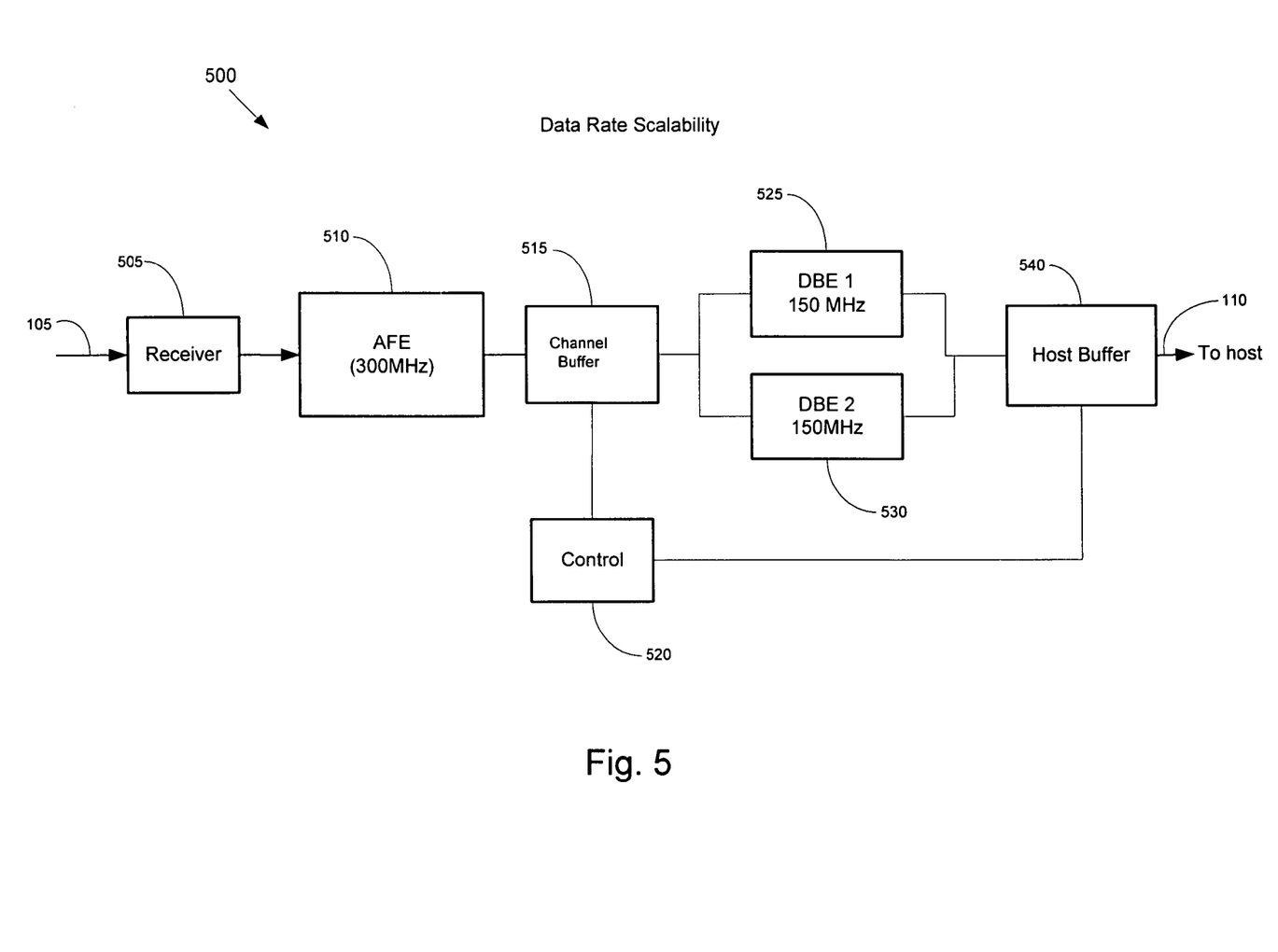
FIGS. 5–8 are functional block diagrams for a data handling system that provides for data rate scalability.

The above systems and methods may be extended, in some examples that use the de-coupled architecture to provide data rate scalability. In one example, a data handling system 500 that provides a scalable data rate is illustrated in FIG. 5. In this example, a receiver 505 is coupled to an input signal 105. The analog front end 510 receives the input signal encoded with information from the receiver 505. The analog front end, in this example, is configured to operate at a data rate of equivalent to 300 Megahertz. The analog front-end is coupled to a memory 515 that is controlled by a control circuit 520. In one embodiment, the control circuit 520 may be incorporated in the buffer manager 125 (FIGS. 1–3), although those skilled in the art will recognize alternative implementations for the control circuit 520. The control circuit 520 operates the channel buffer 515 to alternately select between sending data to digital back-end circuits, DBE1 525 and DBE2 530. In various embodiments, the channel buffer 515 may "push" data out to the DBEs, or data may be "pulled" out of the channel buffer 515 as the DBE's 525, 530 have available capacity to receive a next batch of digital codes for processing. In this example, the DBE1, DBE2 are each configured to operate at an effective data rate of 150 Megahertz. Accordingly, the control circuit 520 may alternately process the incoming stream of information between DBE1 and DBE2. By processing the digitized information in parallel, the overall information handling system can perform in this example at an effective data rate of 300 Megahertz to match the data rate of the AFE 510. After processing by the DBE1 and DBE2, data is then recombined in an appropriate sequence under control of the control circuit 520 into a single series of bits that may be stored in the host buffer 540.

By way of example for the exemplary disc drive system, AFE 510 may store a first sector of samples in channel buffer 515 (memory). Then while AFE 510 captures a second sector of samples, DBE1 525 begins processing the first sector of samples. When AFE 510 begins capturing a second sector of samples, DBE1 is halfway through processing the first sector, and DBE2 starts processing the second sector. By the time AFE 510 finishes capturing the third sector of samples, DBE1 will have completed processing of the first sector of samples and be ready to accept or retrieve the just-stored third sector of samples. In this way, overall throughput is maintained at the cost of a longer pipeline delay. After processing by the DBE units the sectors are put in their proper order and formatted for transfer to the host via host buffer 540. The advantage of such an architecture is that a single low-data-rate DBE design can be used to meet higher data rate requirements.

An alternative embodiment may allow one or more of the DBE blocks to be customized for a particular external function, for example, one DBE block may be modified to assist with other functions outside of the data handling system possibly off-loading work from an external system processor like system processor 155 in FIG. 1.

Another alternative embodiment may include a general-purpose channel processor with some or all of the DBE blocks. And a further embodiment may allow one or more of the processor-enhanced DBE blocks to be customized for a particular function, for example to provide control functionality for the multiple-DBE system.

In other examples, data rate scalability may be implemented in various architectures that employ a decoupled AFE-DBE in accordance with above-described embodiments. As can be appreciated, the elements may be configured in the following exemplary architectures. These exemplary architectures illustrate another example of how the decoupled architecture may provide flexibility in the system design, for example. These architectures may be selected to optimize design parameters, including cost, space, power consumption, and data rate at different nodes in the signal processing path(s) for the overall signal processing system design. As such, the scalability of the digital back-end may provide opportunities for lower overall system costs and increase performance and features by reducing the peak data rate requirement for individual components, software-implemented applications, and processor-executed algorithms. For example, some architectures may be scaled to use a greater number of certain elements than other architectures use. As such, a system designer may use a decoupled AFE-DBE architecture to optimize design parameters of interest. Examples of such systems are illustrated in FIGS. 6–8.

Figure 6:
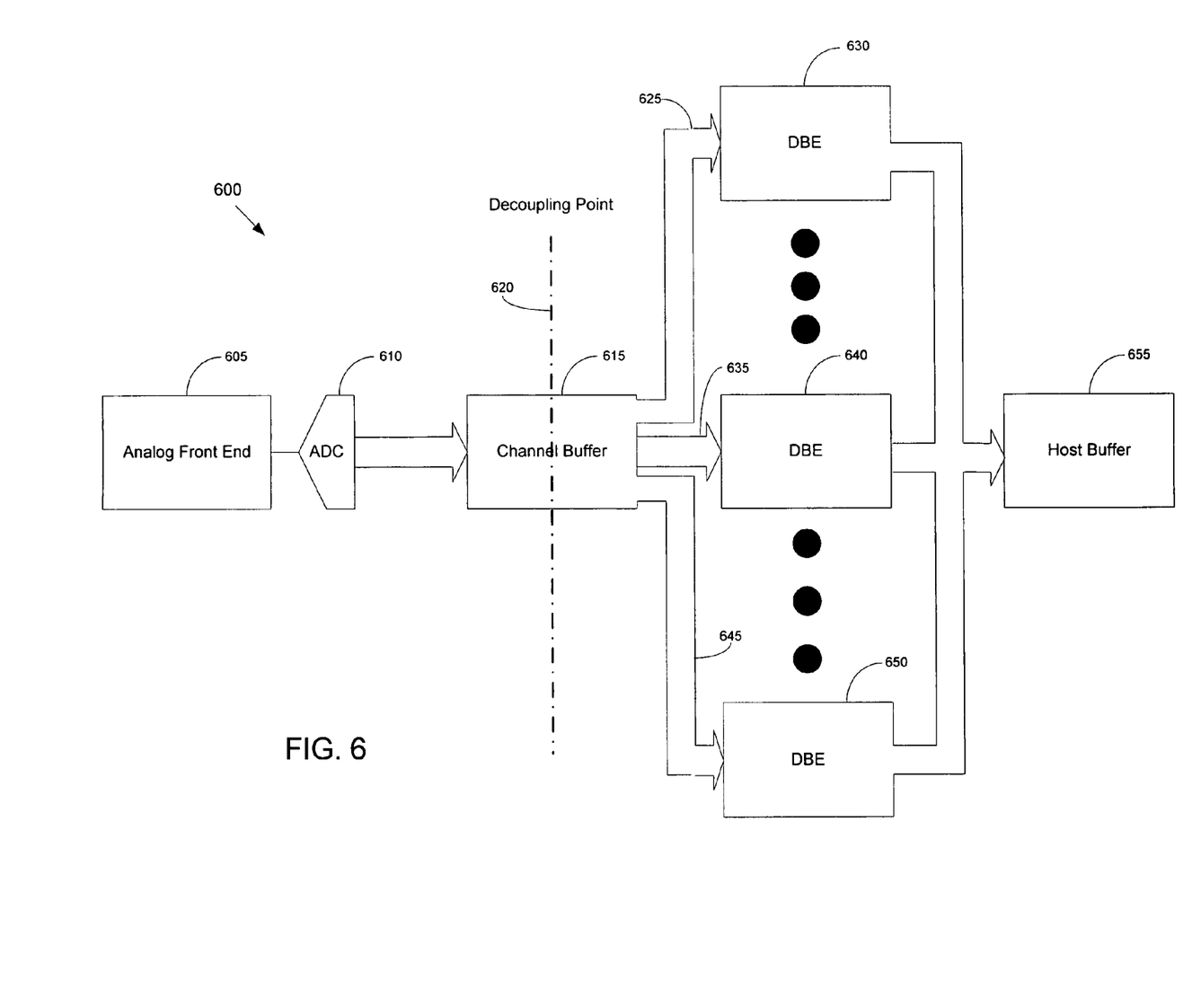

In FIG. 6, three or more parallel DBEs 630, 640, 650 may be operated with appropriate control circuits (not shown) to process digitized samples from a single channel buffer 615. It is an important distinction that the samples are not sent to or retrieved by the DBEs in bit interleaved fashion, but rather in block interleaved fashion. For example with a disc drive application, the entire sequence of samples for a sector is sent to only one DBE. In this way the DBEs do not need to communicate with one another. The outputs of the parallel DBEs are combined and stored in proper sequence in the host buffer 655. As such, the digital back-end to the right of decoupling point 620 and left of host buffer 655 can be scaled to provide a data rate to equal or exceed the throughput capability of the analog front-end 605, channel buffer 615, and host buffer 655.

Figure 7:
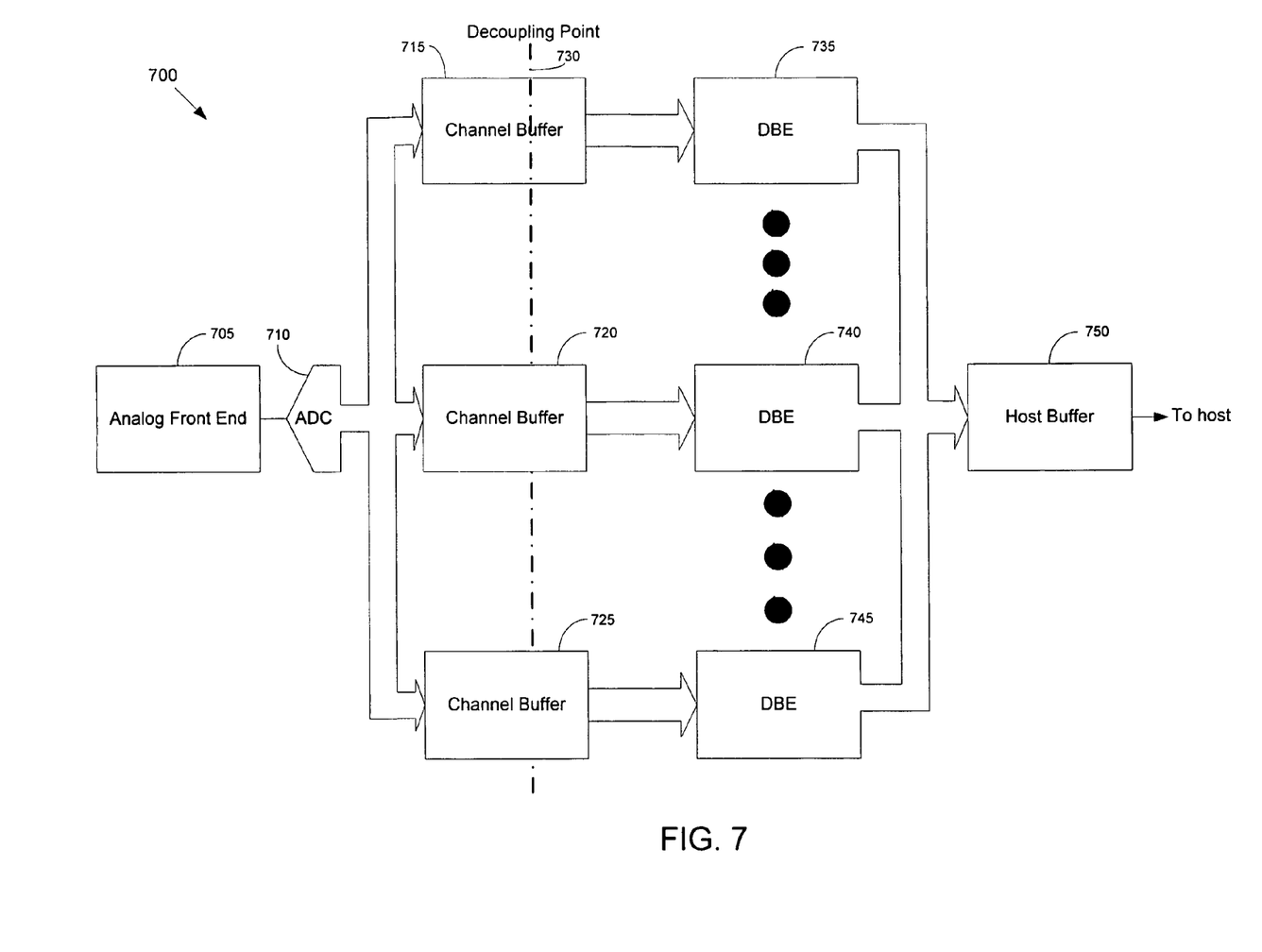

In FIG. 7, the AFE 705 and ADC 710 distribute an analog signal to multiple channel buffers 715, 720, and 725. These channel buffers 715, 720 and 725 may operate in parallel to provide data samples to corresponding DBEs 735, 740, and 745. The channel buffers 715, 720 and 725 may be controlled by a control circuit (not shown) to sequentially receive digital code values output by the ADC 710. In contrast to example system 600, the example system 700 requires less throughput capability from each of channel buffers 715, 720, and 725 than is required of combined channel buffer 615.

Figure 8:
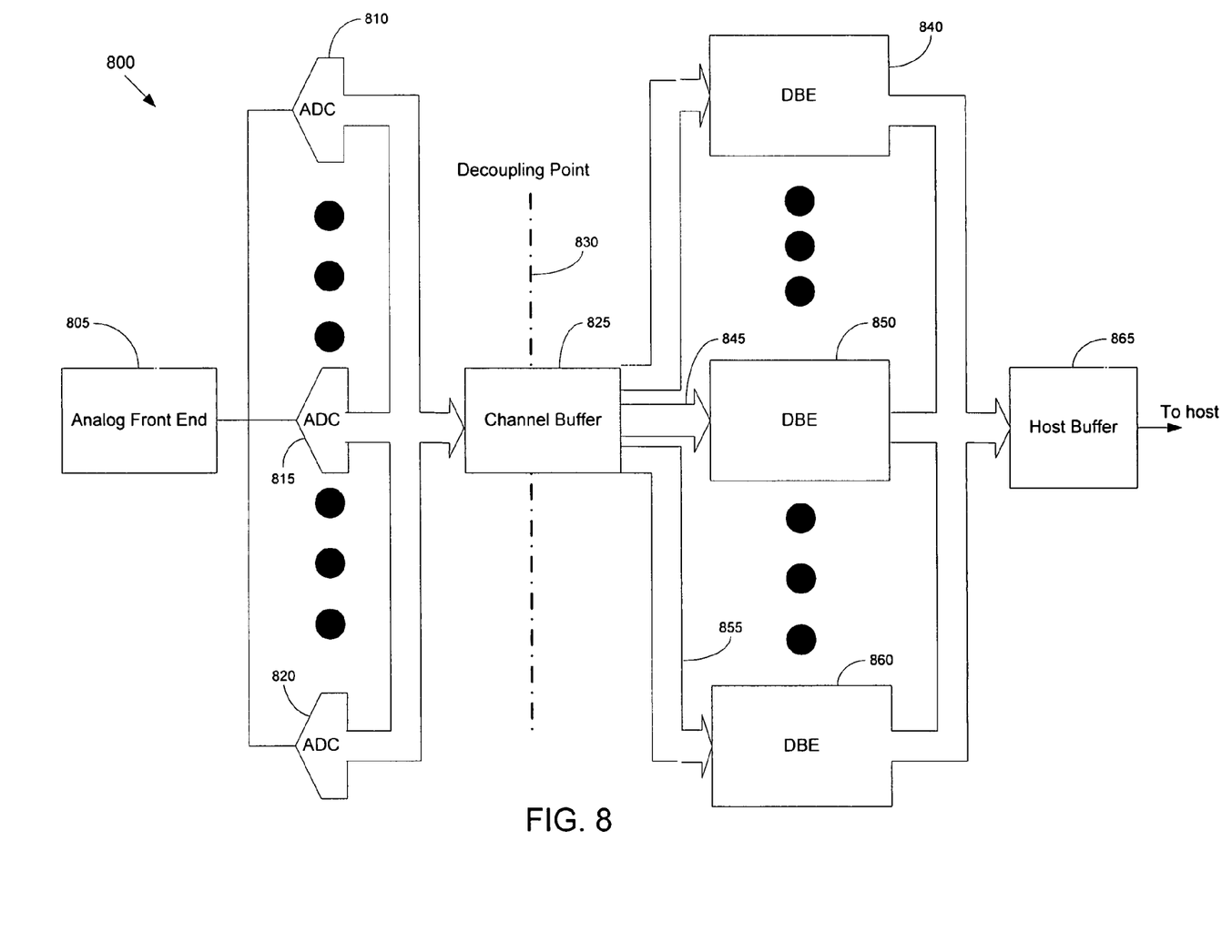

In FIG. 8, the AFE 805 distributes an analog signal to be converted by in sequential order by multiple bit-interleaved ADCs 810, 815, and 820. These digital codes output by each ADC may be sequentially stored in corresponding sequential memory locations in channel buffer 825. Multiple block-interleaved DBEs 840, 845, and 850 may operate in parallel to process the digital code values retrieved from the channel buffer 825. The processed blocks of bits that are produced by the parallel DBEs 840, 845, and 850 may be combined in a proper sequence in the host buffer 865.

In one example, the analog front-end (AFE) receives a signal containing encoded information at its input and outputs a stream of digital values representative of analog values of the input signal. The AFE sends the digital values to a buffer manager. The buffer manager is coupled to a channel buffer memory. In response to receiving the digital values, the buffer manager formats and sends the digital values for storage in the memory. For example, the buffer manager may organize the digital values in a FIFO arrangement when storing the digital codes into the memory. In one example, the buffer manager oversees a direct memory access (DMA) of the digital codes from the analog front-end to the channel buffer memory.

In this example, the AFE may signal the digital back-end (DBE) that data has been stored in the memory and is ready to be processed. In response to the data ready signal, the storage samples (i.e., digital codes) are read out by the buffer manger and sent to the DBE for processing. The DBE, under normal conditions, processes the digital codes according to well-known techniques. Such techniques may involve an equalizer, a Viterbi detector, and a decoder followed by error detection and correction or other parity check. These functions may be performed in hardware, software, or some combination of hardware and software. If no errors are detected, the digital codes will have been converted into bits by the DBE and then sent for storage in the memory. After the samples have been converted to binary bits, the buffer manager may read the bits out of the memory and send them to a controller. The controller includes, in some examples, a formatter that may optionally include an error correction engine. The controller may also include a host interface that handles communications to the host. If error correction was not performed in the DBE, then error correction may be performed in the controller. In some examples, the error detection and correction may be performed in both the DBE and the controller or provided through a combination of the two. Generally, the controller may automate the read and write operations through the buffer manager. A system processor may be coupled to the controller to provide, for example, command information for execution by the controller. Once the data bits have been sent to the controller, the formatter may package the data into a sequence that can be received by the host processor. Using the host interface, the controller may send the formatted data to the host PC using, for example, a link such as IDE, ATA, SCSI, or USB.

In another embodiment, the data handling system may include an analog front-end, a buffer manager, a digital back-end and a controller. The buffer manager would be coupled to a memory, such as embedded DRAM. In some embodiments, a system processor may be coupled to the digital back-end, the controller, and the analog front-end. In such embodiments, the system processor may directly provide command information such as coefficients for the equalizer, for example, to the analog front-end and the digital back-end. The system processor may also communicate with the controller to manage communications with the host. Such an embodiment may have the advantages of a general purpose channel processor, but would need a powerful and therefore expensive system processor in order to simultaneously handle the both the system processor load and the general-purpose channel processor load.

An information handling system comprising AFE, memory, and DBE with a general-purpose channel processor may also be configured to perform self-calibration functions. For example, a system processor may access a series of samples stored in the memory to perform a self-calibration test. During such a test, the system processor can access the samples stored in memory to write and read to the disc drive using the analog front-end and digital back-end in cooperation with the memory as described herein. During such a test, the system processor can determine, for example, the signal-to-noise ratio (SNR) of the system, and make system calibration decisions on the basis of this SNR determination.

In addition, the general purpose channel processor (GPCP) may also perform other characterization tests, such as detection of bad sectors. Those of skill in the art will appreciate that such a system can advantageously use the memory coupled to the buffer manager to perform other tests to characterize the system. Such tests may also be configured to reduce test time on Automatic Test Equipment (ATE) during validation testing, such as at manufacturing time. For example, a GPCP coupled to a DBX, as described with reference to FIG. 3, may be tested by an external tester to verify proper operation of the GPCP itself. A properly verified GPCP can be programmed to exercise the read channel, such as by use of test pattern data that may be stored in the channel buffer. In one example, a GPCP may load test pattern data into the channel buffer. The test pattern data may then be written to a disc in response to instructions executed on the GPCP. The GPCP may subsequently read back the test pattern data from the disc and collect statistical metrics, for example, of the performance of the read channel. Similar techniques may be used to characterize the disc media itself. Other tests, familiar to those of skill in the art, may be performed in response to instructions executed on the GPCP. Accordingly, a GPCP may add value in addition to the advantages associated with the operation and performance of the read channel, as described above.

Figure 9A:
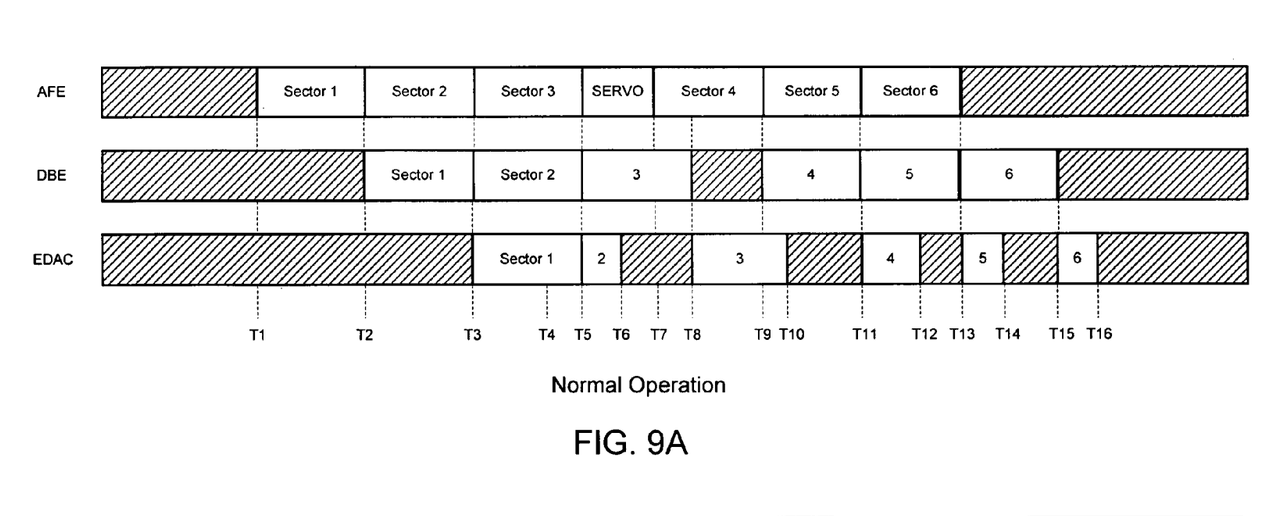
FIGS. 9A–9B are timing diagrams showing the operation sequences at different nodes in a data handling system under normal conditions and when an error is detected.

In FIG. 9A, the timing of a normal operation is shown where any errors are corrected within a single sector time. The AFE, DBE, and error detection and correction (EDAC) show sectors of data advancing through each node in lock step (with sector time offsets).

FIG. 9A depicts a timing diagram for an exemplary embodiment in a disc drive during normal read operation, i.e., when sectors are able to be corrected within the same time required for the AFE to capture of a sector of data. Timing is shown for the three most significant nodes of the system, namely AFE, DBE, and EDAC (error detection and correction). The EDAC may be implemented as a hardware engine, either internal or external to the channel, or implemented using microcode running on either or both of the system and/or channel processors. If EDAC is performed in microcode it may also be accelerated with special purpose hardware. The basic functionality is born out by a pipeline of these three components as exemplified by the figure. The figure shows the entire read channel as being idle prior to the first time interval, T1. During this idle time, the disc drive receives and responds to a request for data, positioning the head and waiting for the rotating media to provide the requested sectors to the read element on the head. The desired data arrives at time T1, at which time the AFE is directed by the formatter to begin reading data, sampling, and storing the data in the buffer memory.

The data itself may be organized into sectors of a predetermined length (in bits), and these sectors may occur consecutively around the disc. Though shown as immediately following one another, there is usually a small gap between sectors to allow for variance in rotational speed without accidentally overwriting data. Another regularly-occurring but larger interruption in the stream of data may be due to servo wedges. These are special radial wedges that may be written periodically around the disc to enable determination of the head's position relative to the media. In the example of FIG. 9A, a servo wedge is encountered between times T5 and T6. Following the example and starting at T1, sector 1 is read from the media and stored in the buffer memory. This read is concluded at time T2. At time T2, the DBE is informed that there is a sector available for processing.

In an alternative embodiment, the DBE may be informed before T2 that a sector is available. In such an embodiment, the control logic or control program may time the DBE processing of a sector to start just late enough so that the DBE does not overtake the AFE and run out of samples to process. In another alternative example, DBE processing is allowed to begin immediately, but must pause whenever it runs out of samples to process. Waiting to begin DBE processing until T2 is an exemplary scheme, and the extra latency (delay) in the data path may be hidden by other disc drive system level latencies.

In an integrated circuit implementation, the AFE and the DBE may be run from the same clock signal, but in a disc drive application where the disc is divided into data rate zones, the AFE's clock should approximately match the disc drive data rate which changes for each zone. It may be simpler in implementation to allow the DBE to run from a fixed rate clock that is never less than the maximum AFE clock rate. If the DBE is run from a fixed rate clock then it will process samples much faster than the AFE can capture samples in a low data rate zone. It will be advantageous if the DBE clock is also faster than the AFE clock in the highest data rate zone. In this way the DBE's GPCP is given extra clock cycles in which to complete the execution of any overhead or extra microcode that may be necessary to complete processing of a sector. The faster clock will also allow the DBE to fall behind the AFE, allowing samples to accumulate in the memory, and catch up later.

Whenever a sector is available, the DBE, according to its control logic or under the program control of the channel processor, may choose to begin processing the sector. The control (by logic or by program) may choose to delay the processing of a sector if it has other higher-priority work to do. In the example of FIG. 9A, the DBE processes sector 1 immediately. This example also depicts a request to read multiple (6) sectors, so while the DBE processes sector 1, the AFE begins capturing the samples for sector 2. At time T3, both the AFE and the DBE complete their respective tasks and move on to the next sector. In general, the DBE may start earlier, either as soon as the first sample is available from the buffer memory (if the DBE is allowed to stall at times when the next sample is unavailable), or as soon as enough samples are available in buffer memory that the DBE will not starve for samples during its processing of the sector. It will be understood that the buffer memory may respond like a FIFO (first-in-first-out) memory device. In this example, the DBE does not start until all the samples are available in the memory, and it will be understood by one skilled in the art that this may provide a simpler implementation when the DBE runs on a faster clock than the AFE.

At time T3, the processing of sector 1 and the capture of sector 2 are both complete. In a pipelined fashion, sector 1 is sent to the error detection and correction engine via an intermediary memory unit, which may be the same buffer memory used for samples, while sector 2 is processed by the DBE and sector 3 is captured by the AFE. FIG. 9A shows an example in which sector 1 requires a full sector time to correct. This is not the case for all sectors, as other sectors may complete the EDAC process early. Sector 1 is depicted as requiring the maximum possible on-the-fly correction, defined to be the maximum level of correction that can be done in a sector time. The EDAC operation for sector 1 concludes just in time to begin the EDAC processing of sector 2 at the normal time. The EDAC processing of sector 2 is shown to complete early, at T6. At T5, the normal pipeline operation is disrupted slightly by a servo wedge that is read by the AFE and sent to separate servo demodulation hardware. The servo wedge produces a gap in the normal DBE processing schedule between T8 and T9 and again in the EDAC processing schedule between T10 and T11, even if sector 3 requires the maximum on-the-fly correction. It will be seen that if sector 3 required more than the maximum on-the-fly correction, additional processing time in the EDAC engine is available during the servo-created gap between T10 and T11.

In yet another embodiment, the system may be capable of correcting, for example, 15 errors within one sector time. However, if more than 15 errors are detected in a sector being processed, then the system need not stop accepting the incoming input signal. By allowing the incoming signal to accumulate either as samples from the AFE or as uncorrected information bits from the DBE in the channel buffer for later processing and/or correction, the system may be operated to continue to make corrections that extend past the 15 error limit for a sector time. After all the errors have been corrected for the current sector, the DBE may be operated to "catch back up" with the AFE by processing the samples stored in the buffer and the EDAC may be operated to "catch back up" with the DBE by correcting uncorrected bits stored in the buffer. This technique may be referred to as extended ECC correction. If the EDAC is capable of more than the maximum on-the-fly correction, then the ability in the present invention of the DBE and EDAC to "catch back up" enables extended ECC correction. In order to take advantage of extended ECC correction, enough parity bits (in ECC symbols) must have been written to the disc to support the extended ECC correction, but this is well known to those skilled in the art. The normal pipeline sequence of operations is shown to resume after the gap at T11, the gap having been created by the servo wedge.

Figure 9B:
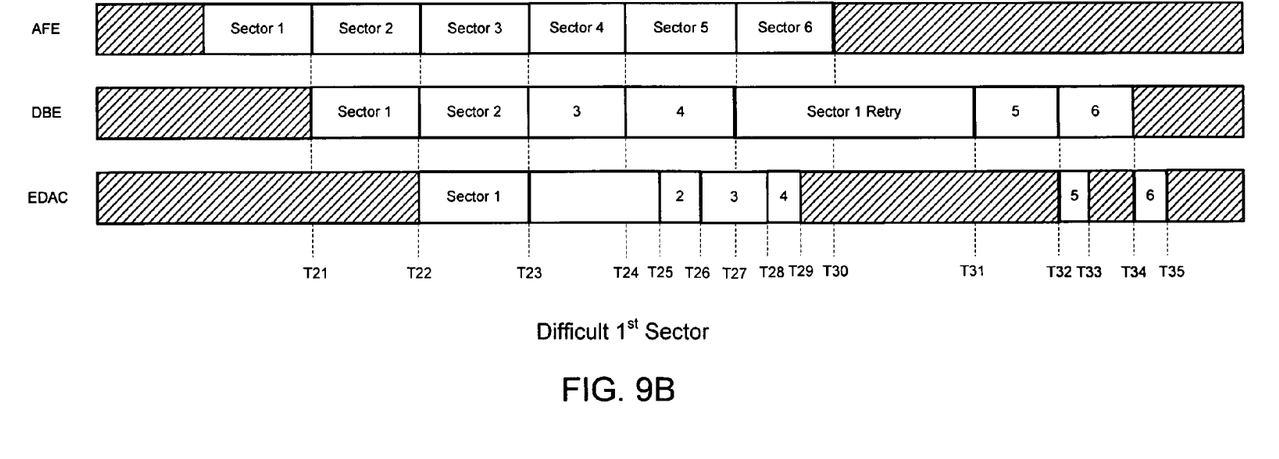

With normal operation described above, the response of the system in other-than-normal operation is illustrated in FIG. 9B. In this example, sector 1 includes errors that are not correctable within one sector time. According to one embodiment, the system continues to read sequential sectors by storing samples in the buffer memory for later processing. Accordingly, the identification of an error in sector 1, uncorrectable within one sector time, does not interrupt the read operation for the AFE. The AFE continues to produce and store samples in the memory until the memory is full or the multiple read operation is complete. Similarly, the uncorrectable error does not immediately interrupt the processing in the DBE. Instead in this example, the EDAC, at time T23 and continuing to time T25, extends its correction time into the time slot that normally would have been allocated to sector 2 and part of sector 3. In the example, the extended ECC correction is illustrated as if it is also unsuccessful. Having exhausted the full, extended correction power at time T25, the control logic or control program determines that sector 1 is uncorrectable, and yet even here the AFE may continue to capture samples for sector 5 as shown, storing them in the memory. The DBE, however, chooses or is instructed by control logic to retry the samples for sector 1 still stored in the buffer as soon as the DBE completes the processing of the sector it is working on at time T25. While the DBE retries sector 1, the AFE continues to capture and store samples for sector 6. Meanwhile at time T25, the EDAC has completed its work on sector 1 and "catches back up" on sectors 2, 3, and 4, which in this example contain fewer errors and correct in a much shorter period of time. This illustrates the response of the decoupled system. As exemplified in FIG. 9, the decoupled processing may continue for as long as the control logic or program can manage the complexity or for as long as sufficient memory exists to store samples and/or uncorrected bits. As described herein, the AFE and DBE portions of the system can operate efficiently and, in this example, in different sequences and at different processing rates, without re-reading the physical sector. It is up to the control logic or control program to determine how best to schedule the processing of the AFE, the DBE, and the EDAC as well as how best to manage the limited memory space in the buffer.

A number of embodiments of the invention have been described. Nevertheless, it will be understood that various modifications may be made without departing from the spirit and scope of the invention. For example, The AFE, DBE, controller, buffer memory, and their sub components may be integrated on a single integrated circuit (IC), or implemented using discrete components and one or more ICs. The functions and processes (including algorithms) may be performed in hardware, software, or a combination thereof. Accordingly, other embodiments are within the scope of the following claims.

What is claimed is:

1. A method comprising:

receiving first and second encoded signals associated with the same information;

sampling the first and second encoded signals;

generating first and second series of digital codes, representative of analog values of each sample of the first and second encoded signals;

storing the first and second series of digital codes in a memory;

computing values that are functions of the first and second series of digital codes; and storing the computed values into the memory.

2. The method of claim 1, wherein computing values that are functions of the digital codes comprises computing values that are averages of the digital codes in the first and second series of digital codes.

3. The method of claim 1, wherein computing values that are functions of the digital codes comprises computing a series of values wherein each value is a function of one of the digital codes in the first series of digital codes and a corresponding one of the digital codes in the second series of digital codes.

4. The method of claim 3, wherein computing a series of values comprises computing averages of the digital codes in the first series of digital codes and corresponding digital codes in the second series of digital codes.

5. The method of claim 1, further comprising converting the first series of digital codes into a series of binary data bits.

6. The method of claim 5, further comprising detecting errors in the series of binary data bits.

* * * * *

UNITED STATES PATENT AND TRADEMARK OFFICE
CERTIFICATE OF CORRECTION

PATENT NO. : 7,196,644 B1 Page 1 of 1
APPLICATION NO. : 10/883633
DATED : March 27, 2007
INVENTOR(S) : Kent D. Anderson, Gregory L. Silvus and Robert W. Warren, Jr.

It is certified that error appears in the above-identified patent and that said Letters Patent is hereby corrected as shown below:

Col. 18, Line 35, "the same information;" should be --information;--

Signed and Sealed this

Fifteenth Day of April, 2008

JON W. DUDAS
*Director of the United States Patent and Trademark Office*